(12) United States Patent
Gauthier, Jr. et al.

(10) Patent No.: US 7,197,197 B2
(45) Date of Patent: Mar. 27, 2007

(54) METHOD FOR DETECTING PROJECTILE IMPACT LOCATION AND VELOCITY VECTOR

(75) Inventors: Leo R. Gauthier, Jr., Ellicott City, MD (US); David G. Drewry, Jr., Middletown, MD (US); Leroy Brunner, Savage, MD (US)

(73) Assignee: The Johns Hopkins University, Baltimore, MD (US)

( * ) Notice: Subject to any disclaimer, the term of this patent is extended or adjusted under 35 U.S.C. 154(b) by 165 days.

(21) Appl. No.: 11/156,754

(22) Filed: Jun. 20, 2005

(65) Prior Publication Data

US 2007/0019897 A1    Jan. 25, 2007

Related U.S. Application Data

(62) Division of application No. 10/485,079, filed as application No. PCT/US02/34377 on Oct. 25, 2002, now Pat. No. 6,931,166.

(60) Provisional application No. 60/343,724, filed on Oct. 25, 2001.

(51) Int. Cl.
  *G02B 6/00* (2006.01)
  *G02F 6/295* (2006.01)
(52) U.S. Cl. .................. 385/12; 385/9; 385/13
(58) Field of Classification Search .................. 385/12, 385/13, 8
  See application file for complete search history.

(56) References Cited

U.S. PATENT DOCUMENTS

| | | | |
|---|---|---|---|
| 4,634,857 A * | 1/1987 | Fey | 250/227.26 |
| 5,157,262 A | 10/1992 | Marsoner et al. | |
| 5,193,816 A * | 3/1993 | Ahmed et al. | 273/373 |
| 5,258,962 A | 11/1993 | Karlsen | |
| 5,669,608 A * | 9/1997 | Thomson et al. | 273/373 |
| 5,988,645 A | 11/1999 | Downing | |
| 5,991,479 A | 11/1999 | Kleinerman | |
| 6,045,888 A | 4/2000 | Chen et al. | |
| 6,198,694 B1 * | 3/2001 | Kroling et al. | 367/127 |
| 6,331,438 B1 * | 12/2001 | Aylott et al. | 436/172 |
| 6,633,462 B2 * | 10/2003 | Adelerhof | 360/315 |
| 2002/0003231 A1 | 1/2002 | Sun et al. | |
| 2002/0006017 A1 * | 1/2002 | Adelerhof | 360/315 |
| 2004/0049356 A1 * | 3/2004 | Bache | 702/33 |

FOREIGN PATENT DOCUMENTS

SE         9601248        * 3/1996

* cited by examiner

*Primary Examiner*—Kaveh Kianni
(74) *Attorney, Agent, or Firm*—Albert J. Fasulo, II (57) ABSTRACT

A method of determining the path of a projectile comprises detecting multiple time of arrivals of the projectile in multiple intersecting planes and determining the path and speed of the projectile based on the multiple times of arrivals.

4 Claims, 7 Drawing Sheets

METHOD FOR DETECTING PROJECTILE IMPACT LOCATION AND VELOCITY VECTOR

CROSS REFERENCE TO RELATED APPLICATIONS

This application is a divisional of allowed, U.S. application Ser. No. 10/485,079, filed Jan. 27, 2004, now U.S. Pat. No. 6,931,166 which is a national stage of international application PCT/US02/34377, filed Oct. 25, 2002, which claims the benefit of U.S. provisional application No. 60/343,724, filed Oct. 25, 2001, each of which is hereby incorporated by reference in its entirety.

STATEMENT OF GOVERNMENTAL INTEREST

This invention was made with U.S. Government support under Navy contract no. N00024-98-D-8124. The U.S. Government has certain rights in the invention.

BACKGROUND OF THE INVENTION

The present invention relates to sensors and in particular to optical sensors. There are both electrical and optical sensors capable of sensing pressure, stress, and penetration of objects. However, present electrical penetration sensors detect penetration of the sensor by a projectile via electrical shorts in the sensor. The penetrating projectile creates the short between two separated conductive layers. This short can be sensed and used to identify a penetration. One of the drawbacks of electrical sensors is the problem of inadvertent shorts of the two separated conductive layers. The conductive layers must be insulated from each other and the other conductive parts of the sensor and from the structure on which the sensor is mounted. This adds to the design, installation, and the overall troubleshooting and maintenance costs of the sensor. Electrical sensors can also generate inadvertent sparks, which in some applications, where explosives might be nearby, is highly undesirable. Electrical sensors are also subject to electrical noise that is generated from electromagnetic interference. Many situations where the detection of penetration is desirable are located close to highly explosive events, which events have been know to generate electrical noise. Noisy electrical signals can be difficult to interpret and can cause erroneous indication of penetration events. Another drawback of using electrical sensors is that the passing projectile can short out the signal cable. This event can erroneously be interpreted as a penetration event at the sensor or, even worse, short out the power supply and cause erroneous readings on other sensors that are connected to the same system. Electrical sensors have also proven to be susceptible to chemicals, which limits their applications.

Current optical sensors are not subject to the shorting problem. For example, ITT Industries, Advanced Engineering & Sciences of Reston, Va. offers a Photonic Hit Indicator. That sensor includes a grid of optical fibers. A projectile that penetrates the sensor cuts some of the optical fibers. Detection of the loss of optical signal in the severed fiber is used to identify the location of the projectile's penetration. This sensor is, however, an active sensor. That is, it requires light to be applied to the optical fibers of the sensor. Severing of the optical fibers by the penetrating projectile prevents the applied light from reaching photodetectors. Detecting the absence of the applied light on the optical fiber of the grid provides an indication of where the projectile penetrated the sensor. One disadvantage of this type of sensor is that a fine and precise layout of many optical elements is needed to achieve a fine spatial resolution of the impact point. In addition, such active layouts of optical fibers are expensive to manufacture. Also, like electrical sensors, they require power to drive the light source or sources for the optical fibers or fibers.

The prior art sensors discussed above provide for penetration time and location. They do not directly provide additional details on the trajectory of the projectile or other penetration characteristics of the projectile. In addition, both methods discussed above degrade significantly as projectile damage accumulates in multiple projectile scenarios. In the case of the electrical detection panels, a penetrating fragment will often leave the panel shorted out. Once a panel is shorted, it cannot detect the penetration of subsequent projectiles. In the case of the Photonic hit indicator, once a projectile penetrates, it creates blind spots at other locations where the same optical fibers run; each optical element is only capable of registering the first projectile passing through.

There are other systems that employ high-speed imaging to measure projectile trajectories. These systems are expensive to purchase and operate and are limited in use to very specific applications.

SUMMARY OF THE INVENTION

It is an object of the present invention to provide an inexpensive optical sensor.

It is a further object of the present invention to provide an optical sensor that does not require power.

It is another object of the present invention to provide an optical sensor that does not require an external light source.

It is still a further object of the present invention to provide an optical sensor structure for detecting the speed and direction of a projectile.

It is still a further object of the present invention to provide an optical sensor structure for detecting the impact location of a projectile.

It is still another object of the present invention to provide a passive optical sensor structure for detecting the speed and direction of a projectile.

It is still another object of the present invention to provide a passive optical sensor structure for detecting the impact location of a projectile.

It is still another object of the present invention to provide a passive optical sensor structure for reliably detecting the trajectory of more than one projectile in succession.

It is still another object of the present invention to provide a passive optical sensor structure for detecting multiple nearly simultaneous trajectories of projectiles.

Another object of the present invention is to provide a method of determining a path of a projectile.

DESCRIPTION OF THE PREFERRED EMBODIMENTS

Figure 1:
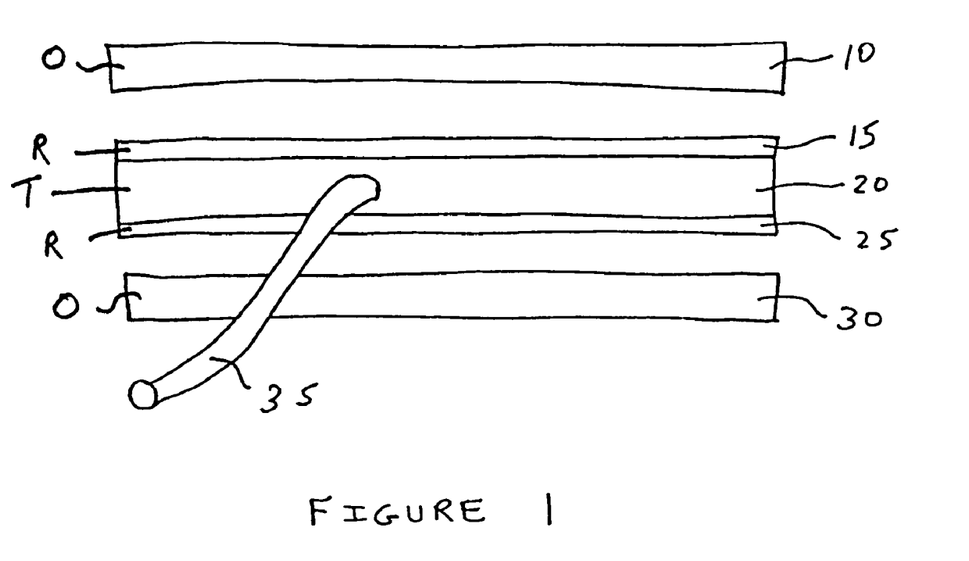
FIG. 1 is an exploded schematic representation of an optical sensor embodying the present invention.

FIG. 1 is an exploded schematic representation of an optical sensor embodying the present invention. In FIG. 1, reference numerals 10 and 30 identify opaque layers. These layers shield a light generator layer (15,20,25) from ambient light. The composition of the opaque layers depends upon the sensor application and the expected ambient light. Some exemplary materials that can be used in the opaque layers 10 and 30 include, but are not limited to, optically opaque plastics such as polycarbonates (e.g., Lexan®) and acrylics (e.g., Plexiglas®), structural fiber reinforced composites, metals (e.g., copper), and silicone molding compounds. In the exemplary embodiment shown in FIG. 1, the light generator layer (15, 20, 25) includes reflective layers 15 and 25, together with a transparent layer 20.

The reflective layers 15 and 25 can comprise, for example, optically reflective plastics such as mirrored polycarbonate (e.g., Lexan®) and acrylic (e.g., Plexiglass®), metal alloy films (e.g., aluminized polyimide-based Kapton®), and highly polished metals. In an exemplary embodiment, the transparent layer 20 can comprise, for example, optically clear plastics such as polycarbonates (e.g., Lexan®) and acrylics (e.g., Plexiglass®) and silicone-based molding compounds such as conformable gels. The transparent layer can also comprise a gas, such as, for example, air, or nitrogen. However, if using a gas for the transparent layer 20, the light sensed by the fiber optic 35, would be primarily generated by a projectile passing through reflective layers 15 and 25 and some portion of the transparent layer may require additional solid supports to maintain the structure.

In general, the optical sensor shown in exploded form in FIG. 1, is a stack of materials designed to provide an optical pulse to the optical fiber, 35, when a sufficiently energized projectile hits and/or penetrates the stack. The optical sensor of the present invention is generally planar. The layers of the sensor are planar in that they have a generally constant thickness along the length and width dimensions of the sensor. They can be constructed to be flexible and to conform to a desired structure of interest while substantially maintaining the thickness of the sensor layers along the length and width dimensions of the sensor. The sensor layers can be cut and/or machined to match pre-existing surfaces. The purpose the optical sensor of the present invention is to provide the time of passage of a projectile through the light generator layer to some external measurement system that is capable of converting the optical pulse into electronic form for storage and/or processing. The value of the information contained within the generated light pulse is specific to each application. The spatial resolution of detection for single element optical sensors of the present invention corresponds to the area of the sensor. The temporal resolution of the measurement is determined by the rate at which the optical fiber is sampled. Since the optical sensor of the present invention is passive, it is intrinsically safe for use in explosive environments and immune to electromagnetic interference.

Figure 2:
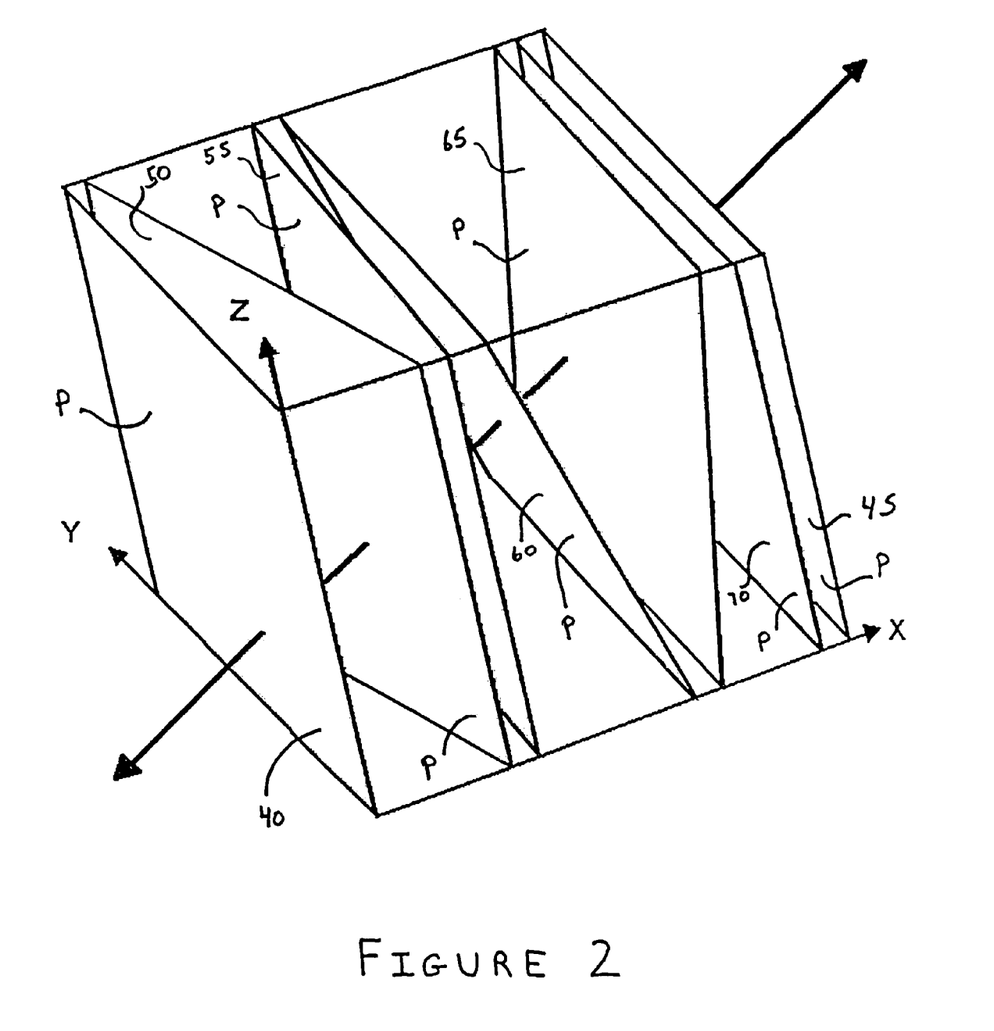
FIG. 2 is a schematic representation of an optical sensor structure embodying the present invention.

FIG. 2 is a schematic representation of an optical sensor structure embodying the optical sensor of the present invention. By using multiple optical sensors in accordance with the present invention in a suitable geometrical arrangement, additional information regarding the nature of the projectile can be obtained. FIG. 2 schematically illustrates an exemplary one of such suitable geometrical arrangements. By employing the exemplary geometric arrangement shown in FIG. 2, additional information that can be computed includes: (1) the penetration location of the projectile on the face of the panel; (2) the three spatial components of projectile velocity; and (3) the speed attenuation factor of the projectile.

An example method for computing (1), (2), and (3) is shown in the exemplary MATLAB code listing below. The velocity attenuation factor (R) of a projectile pertains to the manner in which the projectile loses energy as it passes through the layers of the optical sensors. For a given optical layer, R is defined as the ratio of Vin to Vout, that is, the velocity upon reaching the plane and the velocity upon leaving the plane. For a given optical sensor structure, the velocity attenuation that occurs during the passage through each optical sensor layer is a function of the projectile velocity and size and the composition of the optical sensor structure layers. Since the optical sensor structure can detect the time at which a projectile reaches a given layer of the structure, the times can be used to measure the projectile velocity attenuation factor R. It is also possible to characterize various projectiles by using this additional information. The FIG. 2 structure includes seven optical sensors positioned in seven planes (40, 50, 55, 60, 65, 70, and 45). The optical sensors can be of the type shown in FIG. 1, but are not limited to such sensors. The use of a seventh optical plane (45) in the structure allows for an independent measure of the velocity attenuation R. In the absence of this plane, R must be assumed and significant error can occur in the computation of the projectile parameters. If R is not equal to unity, then the mathematics of computing the projectile trajectory is more complicated, since the velocity will change in a step-wise manner as it penetrates the layers of the optical sensor structure. Because the projectile velocity attenuates as it passes through the optical structure, the measured times corresponding to when the projectile passes each plane should be modified in a specific way prior to the computation of the projectile parameters. The addition of the seventh plane (45) allows for the computation of R. The computation of R then allows the measured penetration times to be corrected for what they would have been if no velocity attenuation had occurred. While the use of the attenuation factor, R, complicates the computational steps, the independent measurement of R provides for a much more accurate trajectory reconstruction. The basic logic is reflected in the exemplary MATLAB code below. The attenuation factor, R, is computed by finding the real root of a fifth order polynomial. Then a matrix is constructed to contract the measured penetration times to what they would have been if R had been unity. The contracted time vector is then used to compute the projectile parameters.

If the initiation time of the projectile motion is also known or measured, then the original location of the projectile at the initiation time can be computed. It is not necessary that the original location is in front the first plane, 40. It can just as well be beyond the last plane, 45. This process is also reflected in the exemplary MATLAB code listing below. If the initiation time measurement is in error, then the computed projectile velocities will still be accurate but the computed initial location will be in error.

If the origination position of a projectile is desired, then the initiation time is needed to determine that position. The measurement of initiation time may be performed differently for different applications. In the case of a bright flash in close proximity, an optical pickup fiber or a photodiode can be used. If an optical fiber is used, it can be attached to the optical sensor structure. The optical fiber should have a large numerical aperture to be able to receive light from many directions. The end of the fiber should be oriented in the expected location of the origination flash. If it is unknown apriori whether the origination flash will occur in front of or behind the sensor structure, then two optical fibers may be used, one looking aft and one looking forward. The two optical fibers may then be joined into one at a 2-to-1 optical coupler. The exemplary MATLAB code uses the parameter t_mark as the initiation time of the projectile. The exemplary code processes the temporal signals with t=0 defining the time when the projectile penetrates first plane, 40. Therefore, t_mark may in fact be negative. If a data system is used that sets t=0 as the initiation time of the projectile. The times need to be shifted so that the penetration of the first plane corresponds to t=0 prior to using the exemplary MATLAB code as is. Care should be exercised if using this approach to ensure that the response time of the initiation detection is minimal. In the case of a more distant flash with audible report from, for example, a bullet, the computation of initiation time would use the local temperature and pressure to compute the sound speed first. This allows for the time that it takes the sound to travel to the audible sensor from the projectile motion-initiating event, such as an explosion or gun firing. The time that the projectile arrives at each layer of the optical sensor structure shown in FIG. 2 is detected via the light pulse generated in each corresponding layer of the structure. These times can be used to compute the three spatial components of the projectile velocity, the impact location, and the speed attenuation factor. With the projectile velocity and the sound speed both known quantities, the initiation time of the projectile motion can then be computed since the distance that the sound travels and the distance that the projectile travels are of course equal.

Referring to FIG. 2, if simultaneous arrival of multiple projectiles with differing trajectories at the structure occurs, then the optical signals produced by the structure can be quite complex. The ability to resolve multiple projectiles is dependent on the particular circumstances. Generally, the multiple projectiles are still resolvable as long as the optical signal from one does not mask the optical signal from another. Masking can occur if two fragments pass through the same plane simultaneously. In some cases, it is possible to resolve multiple trajectories even if limited masking occurs, since the absence of some portions of one trajectory could indicate when the masked signal would have had to have been generated. It is advantageous to keep the optical pulse width that is generated by each penetration as narrow as possible to limit masking as long as the data acquisition system is capable of resolving it. The pulse width can be reduced by adding thermally conductive material to the light generator layer. Such materials might include diamond or metallic thin films or particulates. This reduces the pulse width by rapidly dispersing the heat that is generated during penetration. Photochromic dyes and polymers can also be used to reduce the pulse width. These materials work by reducing optical transmissibility as the signal intensity rises.

Figure 5:
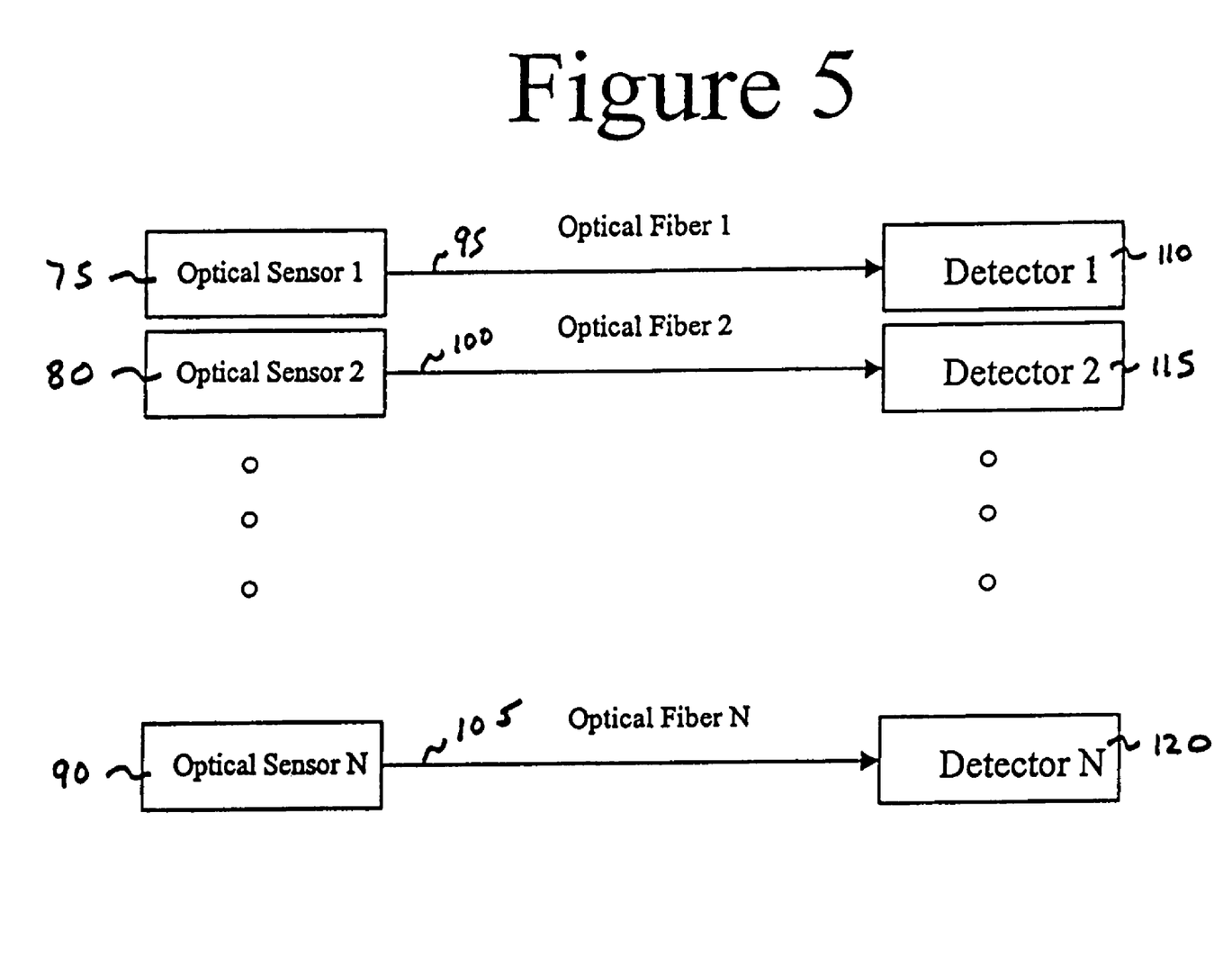
FIG. 5 is a schematic block diagram of a detection system embodying the present invention with a single optical fiber transmitting an optical signal from each optical sensor to a corresponding detector.

If multiple projectile penetrations occur, the penetration times associated with each projectile must be separated prior to using the exemplary MATLAB code. The system configuration can be simplified by using multiple planar elements that are connected to a single optical fiber through a 7-to-1 optical connector (such as schematically shown as element 155 in FIG. 6), rather than each optical sensor layer having its own optical fiber connected thereto as schematically shown in FIG. 5. Thus, only one fiber has to transmit the optical signal to the associated computer for processing in accordance with, for example, the exemplary MATLAB code shown below. It will be understood by those skilled in the art that the exemplary MATLAB code is just that, an example. The invention is not restricted to any given implementation, and can obviously be implemented in a variety of different procedures. One way to use the 7-to-1 optical connector and still be able to resolve multiple penetrations is to spectrally modify the light generated by each layer. This can be accomplished by doping the transparent or reflective layers to tailor the wavelength band that enters the fiber for each plane. The optical filtering could alternatively be performed by using optical filters at the 7-to-1 optical connector. If this technique is used, then seven independent detector channels would be used on the receiving end, each of which is designed to respond to a particular wavelength, such as schematically shown in FIG. 7.

If only one optical fiber is used together with, for example, the 7-to-1 optical connector, then the relaxation time from a single penetration should be less than the inter-panel transit time within the optical sensor structure. This can be realized by choosing materials that rapidly distribute the heat generated when a projectile passes through or alternatively by using special optical materials that reduce optical transmissibility as the intensity rises. Examples of such materials that exhibit photochromic characteristics include silver halide, tungsten oxide, titanium dioxide and other photochromic dyes and polymers. In addition, exemplary heat-dissipative materials could include diamond or metallic films or particulates. As long as the photodiode that is operatively coupled to the fiber optic does not saturate, an AC coupled filtering circuit can also be used to improve the ability to resolve a penetration at a particular optical sensor layer at a particular time within the optical sensor structure. The use of AC coupled filtering circuits effectively extends the dynamic range of the detectors.

The exemplary embodiment of an optical sensor structure shown in FIG. 2 includes 21 elements. It includes seven optical sensors (40, 50, 55, 60, 65, 70, and 45) positioned in respective planes. These optical sensors are identified with the reference letter (P). The exemplary FIG. 2 structure also includes six rectangular spacer panels, and eight triangular wedge panels. These elements are not shown in FIG. 2, but are shown in FIGS. 3 and 4.

Figure 3:
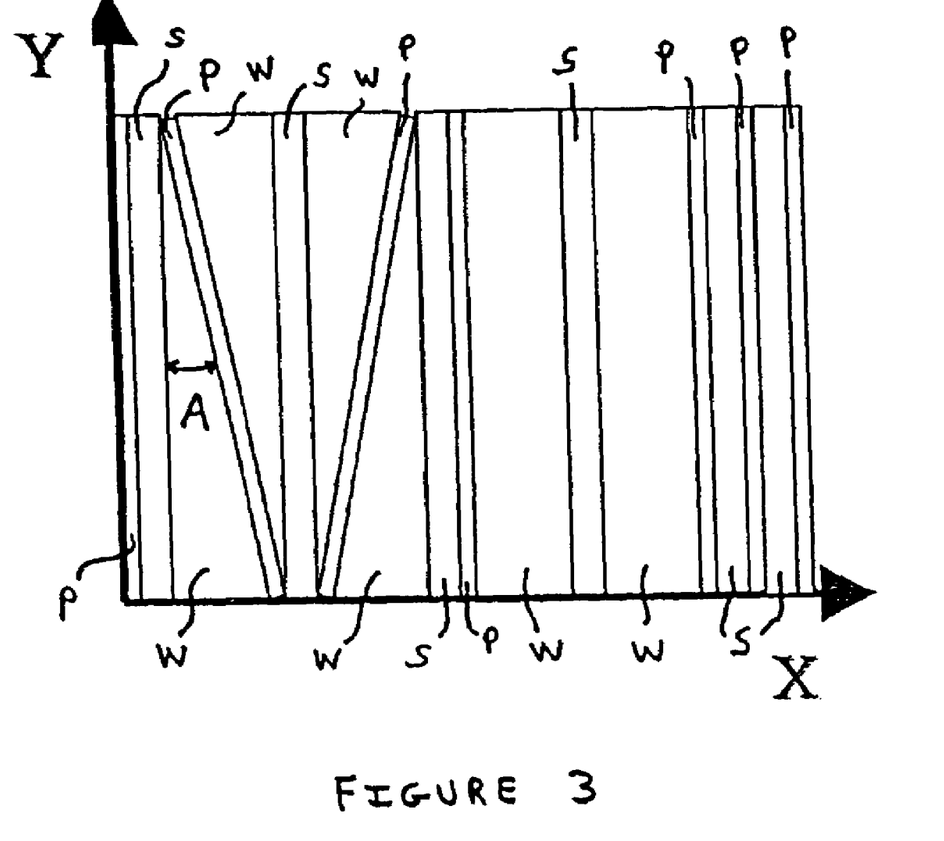
FIG. 3 is a schematic representation of the FIG. 2 optical sensor structure viewed along the XY plane.
Figure 4:
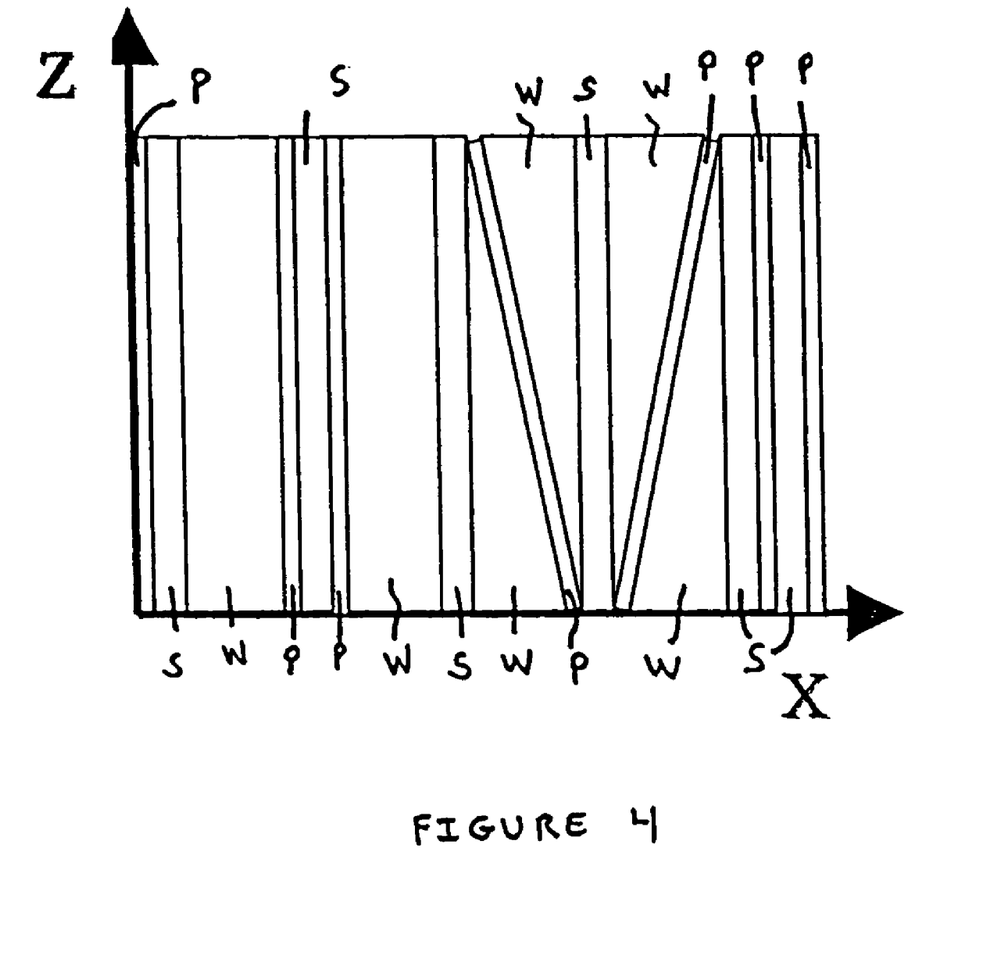
FIG. 4 is a schematic representation of the FIG. 2 optical sensor structure viewed along the XZ plane.

In FIGS. 3 and 4, the spacers are identified with the reference letter (S), and the wedges are identified with the reference letter (W). In FIGS. 3 and 4, two of the eight wedges are not visible in the particular perspective shown in the respective figures. The stack-up of the optical sensor structure illustrated in FIG. 3 in the X dimension is PSW-PWSWPWSWPWSWPWSPSP. Obviously, the orientation of the wedges depends on the optical sensor layer that it is positioning.

Referring to FIG. 2, the end optical sensor layers, 40 and 45, have the dimensions of L×L×S, where L denotes the length and width of each layer, and S is the thickness of the layer. This example uses a square layer, but the shape can be any geometrical shape. The five internal optical sensor layers (50, 55, 60, 65 and 70) are rectangles that, in the illustrated example, have dimensions determined by the tilt parameter D. In the exemplary embodiment discussed herein, the tilt parameter, D, is equal to the arc tangent of the wedge angle A shown in FIG. 3. The dimensions of the interior panels are L×Lsec(A)×S, where Lsec(A) is L times the secant of the angle A. In the illustrated example, all wedge elements are identical, and all spacer elements are identical. If these elements are not identical, the calculations illustrated in the MATLAB code below must be adjusted to account for the different shapes. The spacer elements are rectangular and the dimensions are L×L×(H−S), where (H−S) is the thickness of the spacer element. In this way, the thickness of a back-to-back planar element and spacer element is H. The spacers provide a minimum separation distance between all optical sensor layers. The wedges tilt the optical sensor layers into desired planes. The materials for the spacers and wedges should be thermally stable and incompressible but easily penetrable. Incompressibility is desirable so that the geometry of the sensor structure is maintained as the projectile passes through. Example materials include plastics (polycarbonates (e.g., Lexan®)), silicone gel compounds, and fiber reinforced and non-reinforced polyimide-based composite materials.

While the FIG. 2 structure illustrates one example of the orientation for optical sensors, may other orientations are possible. With reference to FIG. 2, the primary axis of the structure is the X axis because most of the projectile movement is confined to this dimension. The X dimension in the example structure is unique because the plane of the first optical sensor (40) corresponds to X=0 and therefore a pulse from this sensor corresponds directly to when the X dimension of projectile position is equal to zero. No extra computations are required to discern this, as it is a direct result of the geometry of the sensor structure and how the coordinate system was defined. The first and sixth optical sensors in FIG. 2 (40,70) are parallel and their primary use is the measurement of the X dimension of the projectile velocity. For the Y and Z dimensions in FIG. 2, projectile characterization is not as straightforward. The reason for this is that the impact position in the first sensor (40) is not known apriori. For purposes of an optical sensor structure according to the present invention, pairs of additional optical sensors should be positioned in at least two inclined planes for each additional dimension of interest for the projectile parameters. For example, inclined sensors 50 and 55 in FIG. 2 are used to measure the two projectile parameters that are associated with the Y dimension, namely the impact location $y_0$ and the Y component of projectile velocity Vy. Similarly, inclined sensors 60 and 65 are used to measure the Z dimension information. The specific structure illustrated in FIG. 2 is not the only structure that could yield full three-dimensional information regarding the projectile; however at least two planes are need for each dimension of interest and they must be inclined with respect to the primary axis of the structure if both impact position and the velocity component in that particular dimension are desired. In addition, as noted herein, the last sensor (45), such as the seventh sensor is optional and intended to provide better accuracy by providing an independent way to measure the velocity attenuation factor. The use of the extra sensor to measure the velocity attenuation allows for the computation of the fragment parameters with confidence. Without the extra sensor, the fragment parameter computations can only be performed with assumptions regarding the velocity attenuation, assumptions that could introduce measurement error. Obviously, the reference to the seventh sensor is with respect to the FIG. 2 structure. If, for example, basic optical sensor structure in accordance with the present invention has only four sensors, the optional sensor would be a fifth sensor.

As described with reference to the illustrative embodiment shown in FIG. 1, the illustrated optical sensor includes five layers. Referring to FIG. 1, those layers include a transparent layer 20 also labeled as "T" in FIG. 1. The transparent layer 20 or T is sandwiched between two reflective layers 15 and 25 that are also labeled as "R" in FIG. 1. The reflective layers 15 and 25 are in turn sandwiched between two opaque layers 10 and 30 which are also labeled as "O" in FIG. 1. The palindrome stack-up of each optical sensor layer is thus ORTRO. As noted above, the opaque layers 10 and 30 function to prevent ambient light from entering device. The reflective layers function to contain light within the transparent layer 20. The transparent layer 20 couples the light generated by the projectile into an attached optical fiber 35. The overall stack-up of an optical sensor structure is ORTROSWORTROWSWORTROWS-WORTROWSWORTROWSORTROSORTRO. This is a total of 49 elements. An opaque outer jacket is also required around the overall optical sensor structure to preclude ambient light from entering the sensor structure from the edges of the transparent layers of the individual sensor elements. This can be made from the same materials that are used for layers 10 and 30 in the individual sensing elements. Optical fiber attachments to the transparent layers should be secured mechanically to prevent inadvertently dislodging the fiber. Efficient optical coupling is achieved by inserting the optical fiber end directly into the transparent plane of each sensor. Optically clear epoxies can be used to secure the attachment. Alternatively, the optical fibers may be attached edgewise to the transparent planes; however, it is necessary to scratch the outer surface of the fiber by sandblasting or other methods to provide paths for the planar light to enter the fiber. The edgewise attachment method offers advantages for routing the fibers along unobtrusive paths back to the detectors; however, the signal levels are lower, all else being the same. Thus, this method may only be used if the projectile-induced signal levels are large enough to reach the detector thresholds. Interlayer adhesives have not been addressed in the above. The adhesives should have a uniform known thickness. It is also preferable that they do not delaminate pieces of the structure under the intended operational conditions. They are well known to those skilled in the art.

The following discusses some exemplary applications of the present invention.

Single Optical Sensor Layer Applications

A single optical sensor layer embodying the present invention can be used to detect projectiles from an explosive device that impact a surface. In many applications, it is desirable to know when projectiles from an explosive device penetrate at a particular location. The placement of a single optical sensor layer on a surface will allow for the generation of an optical pulse when the projectile impacts and/or penetrates the layer device. The placement of back-to-back layers of the same layer device, with or without a spacer element between them, can provide a rough measure of penetration speed. If it is known that the projectile will penetrate normal to the surface of the two back-to-back layers of the same layer device, then the stack up can be used to compute projectile speed. Tiling of single optical sensor layers can be used to provide for impact coverage over a wider area. By offsetting two tiled layers from each other, additional spatial resolution can be gained.

Other applications include: (1) detection of energetic particles that are capable of generating an optical pulse signature, such as micrometeorite detection; (2) detection of penetration caused by bullets or other high-energy projectiles; and (3) impact detection caused by a localized impulsive force. By using a material that generates light on impact within any of all of the layers 15, 20, and 25, the light could couple into the optical fiber 35, and indicate the application of an impulsive force. Examples of materials that can yield flash augmentation can be readily suspended in particulate, filled bubbles, or microsphere encapsulation forms in the optically clear medium include phosphorescent minerals (barium sulfide, calcium sulfide, and strontium sulfide) and chemical elements (phosphorous), combustible metals (magnesium), and reflective metal alloys (aluminum).

Multiple Optical Sensor Layer Applications

An optical sensor structure that includes multiple optical sensor layers embodying the present invention can be used to detect and characterize projectiles incident on a surface from some explosive device. In the case of an explosion, the projectile characterization can allow for accurate determination of the (1) location of the center of the explosion, location of the impact point on a particular panel, e.g., 40, three-dimensional spatial velocity measurements, and measurement of the velocity attenuation factor R. The exemplary optical sensor structure device shown in FIG. 2 includes seven optical sensor elements in accordance with the present invention. The FIG. 2 structure is capable of resolving impact location and the speed and direction, i.e., the velocity vector of a projectile relative to a coordinate system defined by the construction of the optical sensor structure such as shown in FIG. 2. The FIG. 2 structure is also capable of measuring the velocity attenuation factor associated with projectile penetration. If the initiation time of the explosive device is also known, then the structure is also capable of determining the source position of the projectile at the initiation time. This has immediate application for targets used in missile defense tests. In the case of fragmenting devices, when the time of initiation is known, the FIG. 2 structure can be used to compute the location of the fragmenting device relative to the target vehicle. In the case of target damage projected by kinetic encounter, the FIG. 2 device can be used to provide critically important trajectory data as well. These data can greatly enhance the post-intercept lethality assessment process. The FIG. 2 structure can also be used in live fire testing as a diagnostic tool to identify the center of an explosion.

Another example application is in forensic post-detonation bomb characterization. In high threat locations for explosive devices, a multichannel optical sensor layer, such as shown in FIG. 2, could be installed in advance. If an explosion were to occur, the optical sensor structure could provide valuable forensic evidence that could be used to piece together critical information such as the original location of the bomb and energy content. This information could help investigators to solve crimes. It is particularly useful in that it is not necessary to have the device available after a measurement has occurred. The data record that is transmitted from the device is sufficient to reconstruct the events and characterize the explosion. For example, a FIG. 2 type structure could be used in airplanes to provide forensic evidence of an explosive event if the data from the FIG. 2 structure was recorded in the Flight Data Recorder. In this application, it would be very important to protect the optical fiber that transmits the data to the recorder location.

A FIG. 2 type structure could also be used by bomb squads as a device to characterize a bomb at the time of detonation. Rather than simply detonating a dangerous device, the structure could be used to provide valuable information to characterize the device, such as the mass of projectiles emanating from the bomb.

Another application is in determining the source of a gunshot. The optical sensor structure such as shown in FIG. 2 can be packaged into a portable system that would allow moving infantry to immediately resolve the source position of a gunshot fired by a sniper and provide a measure of the bullet velocity that can be used to immediately help identify the weapon. In this application, it would also be necessary to accurately know the location and orientation of the optical sensor structure at the time of impact with respect to the coordinate system of interest, the battlespace. The use of the audible sound from the shot could be used with the optical sensor structure data to quickly resolve the origination point of the bullet. This information could then be transmitted to situational awareness framework and appropriate defensive action could be taken without delay. Such a system could be contained on the outside of a soldier's pack, for example, and used to be able to rapidly respond to a sniper attack.

The following provides an illustrative analytical solution for determining projectile parameters. Assume that a projectile penetrates an optical sensor structure such as shown in FIG. 2. The following analysis demonstrates how a six component temporal vector can be used, together with the structural parameters of the optical sensor structure, to determine the penetration location ($y_0$, $z_0$) in plane 1, which is the plane that optical sensor layer 40 is positioned and to determine the three components of projectile velocity ($V_x$, $V_y$, and $V_z$). The temporal vector includes the penetration time associated with optical sensors 1 through 6 (40, 50, 55, 60, 65, and 70) positioned in its corresponding plane. Without loss of generality, we are free to define the time when the projectile penetrates plane 1 as $t_1=0$, where plane 1 is the plane in which optical sensor 40 is positioned. Therefore $X(t_1)=x_0=0$. The parametric representation for the trajectory of the projectile is given in equations (1) through (3).

$$X(t)=V_x t \qquad (1)$$

$$Y(t)=y_0+V_y t \qquad (2)$$

$$Z(t)=z_0+V_z t \qquad (3)$$

This parametric representation assumes that the velocity attenuation factor is equal to unity; the projectile passes through the sensor without slowing down. If this is the case, then the six component temporal vector is sufficient to uniquely resolve the projectile impact location and velocity components. Later in the analysis, a sensor in the seventh plane, 45, is used to be able to perform the same computations even when R>1.

In the coordinate system of the optical sensor structure shown in FIG. 2, the equations of the seven planes are in the form shown in equation (4).

$$X+B_{j2}Y+B_{j3}Z=E_j, j=1,2,3,4,5,6,7 \qquad (4)$$

The coefficients $B_{j2}$, $B_{j3}$, and $E_j$ are dependent on the geometric parameters of optical sensor structure construction. A simple construction is described that uses three geometric parameters L, H, and D. L is the width of the optical sensor structure in the Y and Z dimensions. H is the thickness of the spacer element less the thickness of the optical sensor layer. D is the product of L and the tangent (A), where A is the wedge angle that is used to construct the wedge elements show in FIG. 3. With these definitions and the optical sensor structure construction defined, the equations for planes 1 through 6 (40, 50, 55, 60, 65, and 70) are listed in equations (5) through (10).

$$X=0 \quad \text{plane1} \tag{5}$$

$$X+DY=(H+D)L \quad \text{plane2} \tag{6}$$

$$X-DY=(2H+D)L \quad \text{plane3} \tag{7}$$

$$X+DZ=(3H+3D)L \quad \text{plane4} \tag{8}$$

$$X-DZ=(4H+3D)L \quad \text{plane5} \tag{9}$$

$$X=(5H+4D)L \quad \text{plane6} \tag{10}$$

The next step is to substitute the parametric equations for the projectile into the X, Y, and Z variables in the planar equations. The time of penetration of plane j is denoted as $t_j$. The new equations are shown in (11) through (16).

$$V_x t_1 = 0 \quad \text{plane1} \tag{11}$$

$$V_x t_2 + D(y_0 + V_y t_2) = (H+D)L \quad \text{plane2} \tag{12}$$

$$V_x t_3 - D(y_0 + V_y t_3) = (2H+D)L \quad \text{plane3} \tag{13}$$

$$V_x t_4 + D(z_0 + V_z t_4) = (3H+3D)L \quad \text{plane4} \tag{14}$$

$$V_x t_5 - D(z_0 + V_z t_5) = (4H+3D)L \quad \text{plane5} \tag{15}$$

$$V_x t_6 = (5H+4D)L \quad \text{plane6} \tag{16}$$

Equation (11) says that $t_1=0$. Equations (12) through (16) can be expressed in the matrix form MP=Q, as shown in equation (17).

$$\begin{pmatrix} D & 0 & t_2 & Dt_2 & 0 \\ -D & 0 & t_3 & -Dt_3 & 0 \\ 0 & D & t_4 & 0 & Dt_4 \\ 0 & -D & t_5 & 0 & -Dt_5 \\ 0 & 0 & t_6 & 0 & 0 \end{pmatrix} \begin{pmatrix} y_0 \\ z_0 \\ V_x \\ V_y \\ V_z \end{pmatrix} = \begin{pmatrix} (H+D)L \\ (2H+D)L \\ (3H+2D)L \\ (4H+3D)L \\ (5H+4D)L \end{pmatrix} \tag{17}$$

And the solution for the projectile parameters P is found by inverting M and multiplying by Q, equation (18).

$$P = M^{-1}Q \tag{18}$$

In practice, the time vector is measured based on the optical pulse provided to a computer from the fiber optic, such as 35, associated with each of the six optical sensor layers of the FIG. 2 optical structure. Matrix M is then constructed based on the time vector. Then matrix M is inverted and matrix multiplied by Q for the solution P. The MATLAB code below, provides an exemplary solution embodying the above analysis for a simulated projectile solution.

Once P is known, then the projectile position can be computed for any time given, assuming straight-line constant velocity motion of the projectile. For a given time t_mark the position of the projectile can be computed per equations (1) through (3) with t_mark substituted for t. This would allow, for example, the determination of the origination point of a projectile if the initiation time was known. In some applications, the initiation time may be measured optically by using another optical fiber on the optical sensor structure shown in FIG. 2 to detect the light from the explosion. In other cases, such as for a gunshot, the initiation time must be computed from the knowledge that the sound and the projectile must travel the same distance to the optical sensor structure. If a sound transducer is located on plane 1 of the structure, the sound detection time $t_s$ is known. This time will likely occur after the projectile has already arrived at t=0. To compute the initiation time in this case, it is first necessary to compute the local sound speed, which is known to be a function of the air temperature and pressure. Assuming these measurements are available at the computer connected to the optical sensor structure, then the local sound speed S is known. Equation (19) then shows the equation for computing the bullet initiation time.

$$t\_\text{mark} = St_s/(S - \sqrt{V_x^2 + V_y^2 + V_z^2}) \tag{19}$$

This value can then be substituted for t in equations (1) through (3) to compute the spatial coordinates where the gunshot initiated relative to the optical sensor structure. It the sensor was not secured to a fixed position, it would also be necessary to have a record of the sensor location and orientation at the time of impact with respect to the battlespace coordinate system if the additional information was to be of use since the sensor computations of the projectile parameters are performed relative to the sensor coordinate system at the time of impact.

In some applications, fewer planes within the optical sensor structure may be used if less information is needed. For example, those skilled in the art will recognize that a four plane system would be sufficient to resolve $V_x$, $V_y$, and $y_0$ (assuming R=0) by employing an approach similar to that described above.

Handling Speed Attenuation

As a projectile passes through the sensor, it may experience speed attenuation as energy is transferred into the optical sensor structure. This results in a stretching of the time vector response. A method is described here for correcting for this phenomenon by processing the time vector prior to performing the computation of P. The resulting contracted time vector is the time vector that would have been measured if no speed attenuation had occurred. The velocity attenuation parameter R is defined as the ratio of the input speed to the output speed, for a single planar element, per equation (20). It is assumed that the inter-panel material slows the projectile by a negligible amount.

$$R = \text{In\_speed}/\text{Out\_speed} \tag{20}$$

A recursive relationship then exists that allows for the computation of the stretched time vector from the unstretched time vector, equation (21), where the variable r corresponds to the stretched time vector.

$$r_n = r_{n-1} + (t_n - t_{n-1})R^{n-1} \tag{21}$$

The solution to this recurrence relation provides a linear relationship between the contracted time vector and the stretched time vector that can be expressed in matrix form Kt=r. Since the time of penetration through the first panel is still equal to zero, only the times corresponding to the penetration of planes 2 through 7 are relevant for the computation of P; ie $r_1=t_1=0$. The full expression of this matrix equation is shown in equation (22).

$$\begin{pmatrix} R & 0 & 0 & 0 & 0 & 0 \\ R-R^2 & R^2 & 0 & 0 & 0 & 0 \\ R-R^2 & R^2-R^3 & R^3 & 0 & 0 & 0 \\ R-R^2 & R^2-R^3 & R^3-R^4 & R^4 & 0 & 0 \\ R-R^2 & R^2-R^3 & R^3-R^4 & R^4-R^5 & R^5 & 0 \\ R-R^2 & R^2-R^3 & R^3-R^4 & R^4-R^5 & R^5-R^6 & R^6 \end{pmatrix} \begin{pmatrix} t_2 \\ t_3 \\ t_4 \\ t_5 \\ t_6 \\ t_7 \end{pmatrix} = \begin{pmatrix} r_2 \\ r_3 \\ r_4 \\ r_5 \\ r_6 \\ r_7 \end{pmatrix} \quad (22)$$

Note that if R=1, then K is equal to the identity matrix and the time vector is not stretched. In actual application, the measured time vector r must be contracted using the inverse transformation, equation (23) $t=K^{-1}r$ prior to the computation of the parameter matrix P. R must be known to be able to accomplish this.

$$t=K^{-1}r \quad (23)$$

A method is described for computing R and hence the matrix K from the original time vector. This is significant since R may vary from one projectile to the next. Even if R=1.001, the computed hit location and projectile velocity will have significant error if the actual speed attenuation is not taken into account. Since stretched time vectors can have computationally valid solutions for the projectile parameters, it is important that speed attenuation be known and the time vector is contracted prior to the computation of the projectile parameters. One way to build the measurement of R into a sensor structure in accordance with the present invention is to use a seventh plane (45) after the sixth sensor (70). The method here is to find the value of R that yields a contracted time vector and resulting $V_x$ that is consistent with the signal from the sensor in the seventh plane (45). The known spacing between the sixth and seventh sensors (70 and 45), HL, along with the temporal relationship of their responses yields an independent measure of $V_x$ at that point in the trajectory. Since the x component of the velocity must have the same attenuation R, it is possible to compute a single value of R that is consistent. Equation (24) expresses the nomenclature used in the following derivation and in the exemplary MATLAB code listing.

$$r_{ij}=r_i-r_j \quad (24)$$

Since the projectile must pass through six planes to get to the seventh, it experiences six speed reductions before it gets to the final, seventh sensor plane. This also holds true for each component of the velocity vector; therefore, an expression for $V_x$ is shown in equation (25).

$$HLR^6=V_x r_{76} \quad (25)$$

Similarly, if the projectile had not been retarded during passage, another expression can be written based on a contracted time when the projectile would have reached the sixth sensor (70), equation (26).

$$(5H+4D)L=V_x t_6 \quad (26)$$

Solving both equations for $V_x$ and equating them yields equation (27), where L cancels out.

$$(5H+4D)/t_6=HR^6/r_{76} \quad (27)$$

The recurrence relation, equation (21), can be used to develop an expression for $t_6$ in terms of the components of the stretched time vector, equation (28).

$$t_6=R^{-5}r_{65}+R^{-4}r_{54}+R^{-3}r_{43}+R^{-2}r_{32}+R^{-1}r_{21} \quad (28)$$

Substituting equation (28) into equation (27) yields a $5^{th}$ order polynomial, equation (29) in R and the real solution is the R value as measured directly from the stretched time vector.

$$\frac{-Hr_{21}R^5-Hr_{32}R^4-Hr_{43}R^3-Hr_{54}R^2-Hr_{65}R+(5H+4D)}{r_{76}}=0 \quad (29)$$

This has been validated in the exemplary MATLAB code listing. The independent measure of R by the use of a seventh sensor results in much greater accuracy and potentially can be correlated to the caliber of a projectile for a given sensor structure.

Scaling of Time Vectors

As would be expected, the scaling of a time vector by a scalar quantity W results in computed velocity components that are scaled by $W^{-1}$ with impact position unchanged.

Exemplary MATLAB code Listing

```
% In a six sensor structure, five equations can be used by computing based
on t=0 when fragment hits front panel of MPOPS
% The equations directly yield fragment hit location at the first plane and
% velocity. Initial positions can then be computed based on initiation
% time. In real application, the initiation time may not be available.
% The following solution is not dependent on initiation time knowledge for
% The code checks if the temporal vector is ordered
% If the vector is ordered, the solution is found
% If not, an error message is issued
%
% The ratio of input speed/output speed = R
% A matrix K is used to contract the time vector prior to computing P
% If R=1 (ideal case), then K is the identity matrix
%
% The code allows the use of a seventh sensor to compute R
% from temporal measurements. The method requires the solution of a 5th
% order polynomial. By independently measuring
% R, the resulting projectile parameters are more accurate. Also the
% measurement of R provides additional information about how the projectile
% interacts with the optical sensor structure. This additional information
% might be sufficient to resolve weapon caliber or particle size. The
% seventh sensor is in a plane that is parallel to the sixth plane behind
% an additional spacer element. In this
```

-continued

Exemplary MATLAB code Listing

```
% simulation, R is given to allow for computation of the retarded time
% vector. Then computation of R from the retarded vector proves that a
% measured retarded time vector will yield the same R directly. The
% derivation of the 5th order equation requiring solution is beyond the
% scope of this comment.
%
%
% Approach is to encode six planar equations in coordinate system (1st
% equation is trial, x0=0);
% Specify fragment parameters
% Compute plane penetration times, assuming plane 1 is penetrated at t=0
% Back-compute fragment parameters from penetration time vector
% Then compare back-computed parameters to original
% This allows for proof of concept since single panel test has already
% been performed
% This will allow testing the effect of deceleration and panel
% intolerances as well by interactively adjusting the forward computed
% penetration times and analyzing the effect on back-computed fragment
% parameters
%
% Panel design parameters
%
% H=interpanel gap/L
% D=percent depth change of wedge across panel width
% L=panel width=panel height
% Width is Y dimension
% Height is Z dimension
% Depth is X dimension
% d=thickness of an individual POPS element relative to L
% R=panel speed reducing ratio; Input speed/Output speed = R for a plane
% T=overall 6-DOF POPS thickness
%
clear all;
%
d=0.01;
L=1;
H=0.05;
D=0.15;
R=1.03;
T=(5*H+4*D)*L
%
% For now it is assumed that D is part of interchannel gap
% Later it may be necessary to upgrade code
%
% Fragment parameter vector has six components
%
% x_init,y_init,z_init,vx,vy,vz
%
% x_init,y_init,z_init is initial fragment position
% vx,vy,vz is fragment velocity vector
%
% units of x_init, y_init, and z_init are panel widths, relative to
coordinate system
% in Figure illustrating the 6-DOF POPS
%
% units of vx, vy, and vz are panel widths per millisecond
%
% The supplied parameters for the simulation are x_p1, y_p1, z_p1, t_mark,
vx, vy, and vz.
% x_p1, y_p1, and z_p1 are the x,y,z components of the hit point
% and t_mark is the time of interest of the fragment relative to impact
% time at p1. t_mark could be the initiation time or some other time of
interest for the fragment.
% A negative t_mark value corresponds to pre-impact position.
% A positive t_mark value corresponds to post-impact position.
% the vx, vy, and vz are the supplied fragment velocity components (vx < >
% 0). vx can be negative and impact times are still computed relative to impact
% at p1
%
x_p1=0;
y_p1=0.5;
z_p1=0.2;
t_mark=0;
vx=3;
vy=0.2;
```

-continued

Exemplary MATLAB code Listing

```
vz=0.2;
%
% Compute the mark point based on the supplied simulation parameters
%
x_mark=x_p1+vx*t_mark;
y_mark=y_p1+vy*t_mark;
z_mark=z_p1+vz*t_mark;
Fin=[x_mark y_mark z_mark vx vy vz];
%
% Fsim is the starting point of the fragment at the MPOPS.
Fsim=[x_p1 y_p1 z_p1 vx vy vz];
%
% Computed penetration times for planes 1 through 6 assuming K=1.
%
t1=0;
t2=((H+D)*L-Fsim(1)-Fsim(2)*D)/(Fsim(4)+Fsim(5)*D);
t3=((2*H+D)*L-Fsim(1)+Fsim(2)*D)/(Fsim(4)-Fsim(5)*D);
t4=((3*H+3*D)*L-Fsim(1)-Fsim(3)*D)/(Fsim(4)+Fsim(6)*D);
t5=((4*H+3*D)*L-Fsim(1)+Fsim(3)*D)/(Fsim(4)-Fsim(6)*D);
t6=((5*H+4*D)*L-Fsim(1))/Fsim(4);
t7=((6*H+4*D)*L-Fsim(1))/Fsim(4);
t=[t1 t2 t3 t4 t5 t6 t7];
%
% Check that temporal vector is ordered
%
s=sort(t)     %sorts in ascending order
r=fliplr(s) %flips left to right
% Perform computations iff temporal vector is ordered
if (all(t == s) | all(t == r))
%
% K is a matrix used to convert an unretarded time vector to a retarded
% time vector. It arises from a recurrence relation documented elsewhere
% K is the identity matrix iff R=1
%
K(1,:)=[R 0 0 0 0 0];
K(2,:)=[R-R^2 R^2 0 0 0 0];
K(3,:)=[R-R^2 R^2-R^3 R^3 0 0 0];
K(4,:)=[R-R^2 R^2-R^3 R^3-R^4 R^4 0 0];
K(5,:)=[R-R^2 R^2-R^3 R^3-R^4 R^4-R^5 R^5 0];
K(6,:)=[R-R^2 R^2-R^3 R^3-R^4 R^4-R^5 R^5-R^6 R^6];
%
%Generate the retarded time vector r
r = K*t(2:7)';
% Contract the retarded time vector
tempt=inv(K)*r;
t=[0 tempt'];
% solve 5th order polynomial for R based on retarded time vector
r = [0 r'];
f=diff(r);
rpoly=[-H*f(1) -H*f(2) -H*f(3) -H*f(4) -H*f(5) (5*H+4*D)*f(6)];
solution = roots(rpoly);
R_comp=solution(5)
R
% Define the measurement matrix M and the depth vector Q
%
M(1,:)=[ D   0 t(2)  D*t(2)   0        ];
M(2,:)=[-D   0 t(3) -D*t(3)   0        ];
M(3,:)=[ 0   D t(4)  0        D*t(4)  ];
M(4,:)=[ 0  -D t(5)  0       -D*t(5)  ];
M(5,:)=[ 0   0 t(6)  0        0        ];
%
Q(1,1)=(H+D)*L;
Q(2,1)=(2*H+D)*L;
Q(3,1)=(3*H+3*D)*L;
Q(4,1)=(4*H+3*D)*L;
Q(5,1)=(5*H+4*D)*L;
%
% List times that fragment passes each plane, referenced to the first plane
% Compute the Fragment Vector Output Fout and Compare to the Fragment Vector
% Input Fin. The fragment parameters fp is the matrix product of the
inverse of M times D
% The first 2 components of fp are the computed Yhit and Zhit values and the
last 3 components are the
```

| Exemplary MATLAB code Listing |
|---|
| % computed fragment velocity components vx, vy, and vz.<br>% Fout is then computed to compare with Fin<br>%<br>t<br>r<br>P=inv(M)*Q;   %fragment parameters<br>Hit=[0 P(1) P(2)]<br>Vel=[P(3) P(4) P(5)]<br>Inspeed=sqrt (P(3)^2+P(4)^2+P(5)^2)<br>Outspeed=Inspeed/R^6<br>Fin<br>Fout=[t_mark*Vel(1) P(1)+t_mark*Vel(2) P(2)+t_mark*Vel(3) Vel(1) Vel(2) Vel(3)]<br>save C:\MATLAB6p5\work\pops-output.txt t r Hit Inspeed Outspeed Fin Fout - ASCII<br>else<br>   disp('Scrambled time vector...multiple hit or data system error ')<br>end |

FIG. 5 is a schematic block diagram of a detection system embodying the present invention with a single optical fiber transmitting an optical signal from an optical sensor to a corresponding detector. In FIG. 5, optical sensors embodying the present invention (75, 80, and 90) are connected via respective individual optical fibers (95, 100, and 105) to corresponding detectors (110, 115, and 120). The detectors 110, 115, and 120 can comprise, for example, photodetectors. The detectors 110, 115, and 120 can provide, for example, optoelectronic conversion of the optical signal detected on fiber optics 95, 100, and 105. The detectors can also provide filtering and threshold detection of the electric signal generated by the detectors. While not shown in FIG. 5, the detectors are operatively coupled to a computer that receives the time pulses provided by the optical sensors 75, 80, and 90 and detectors 110, 115, and 120. These time pulses can be processed in accordance with the above equations and processing represented by the exemplary MATLAB code.

Figure 6:
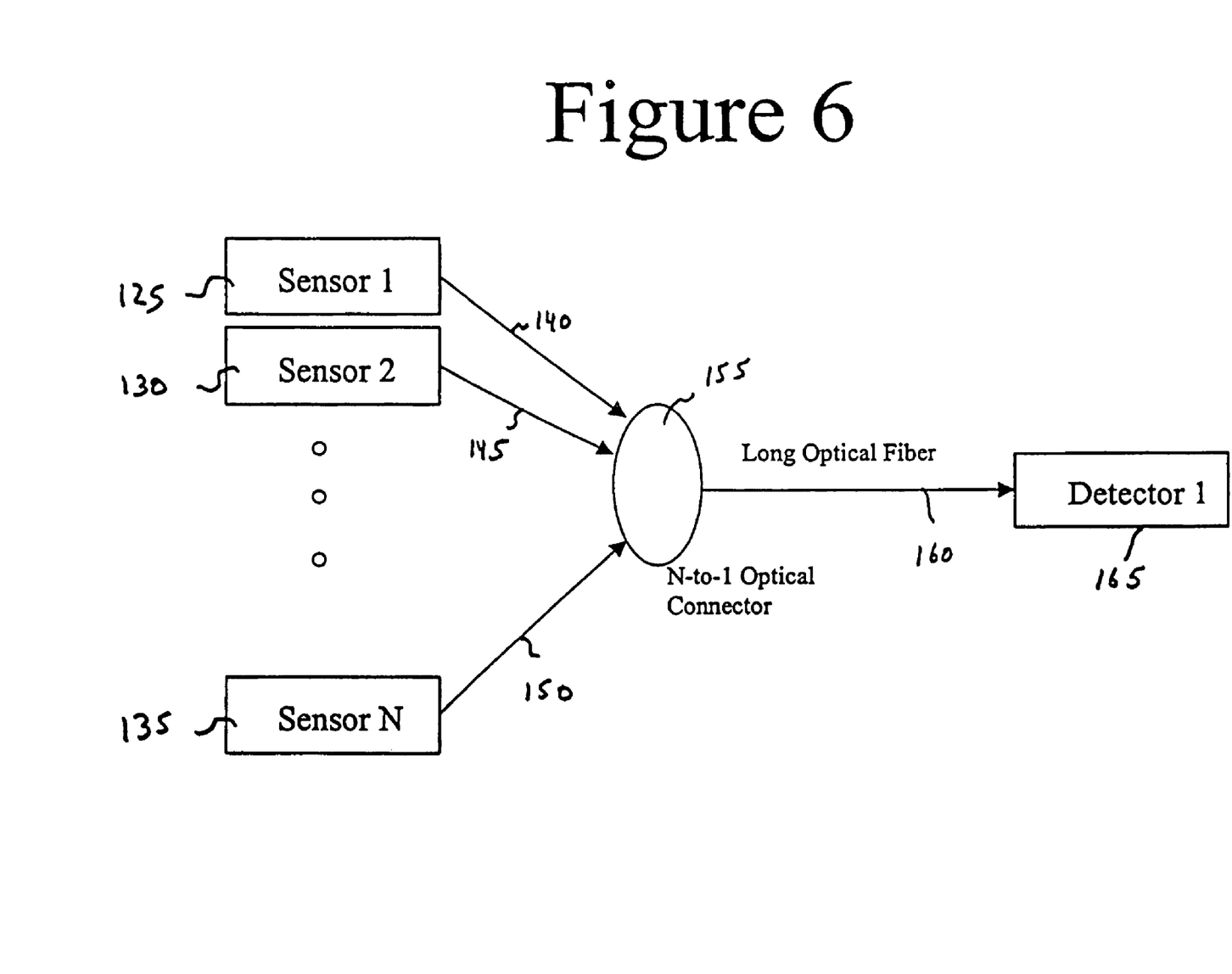
FIG. 6 is a schematic block diagram of a detection system embodying the present invention with a single optical fiber transmitting all optical sensor signals to a single detector.
Figure 7:
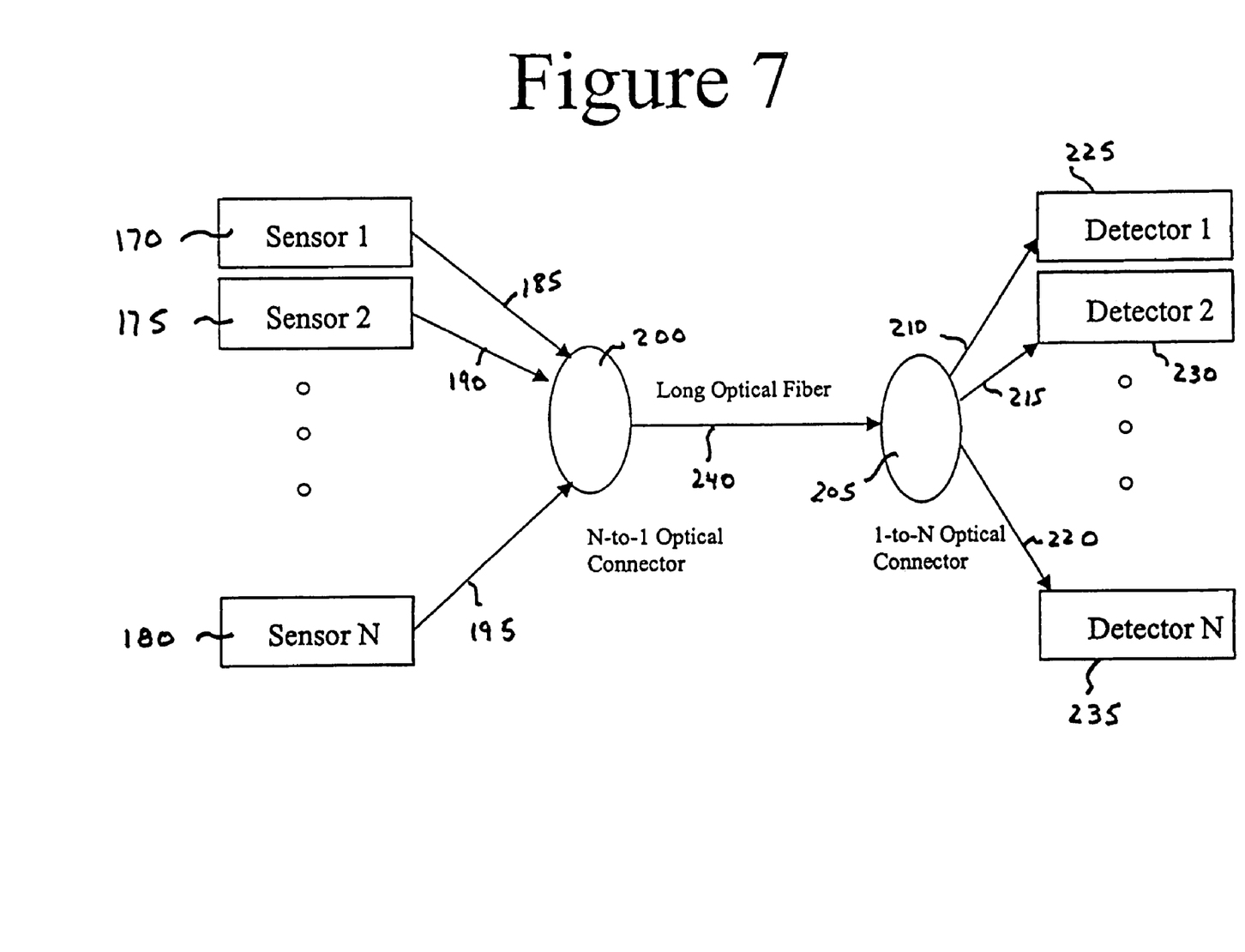
FIG. 7 is a schematic block diagram of a detection system embodying the present invention with a single optical fiber transmitting all optical sensor signals to an array of detectors.

FIG. 6 is a schematic block diagram of a detection system embodying the present invention with a single optical fiber transmitting all optical sensor signals to a single detector. In FIG. 6, optical sensors 125, 130, and 135 are connected to an N-to-1 optical connector, 155, via short or local optical fibers 140, 145, and 150. As is known to those skilled in the art, the N-to-1 optical connector, 155, couples the light from each of the optical fibers, 140, 145, and 150 into the optical fiber 160. The optical fiber 160 carries the optical signals to the detector 165, which is typically located a safe distance from the event being monitored by the optical sensors, such as an explosion. The detector 165 can comprise, for example, a photodetector. The detector 165 can provide, for example, optoelectronic conversion of the optical signal detected on fiber optic 160. The detector can also provide filtering and threshold detection of the electric signal generated by the detector. While not shown in FIG. 6, the detector 165 is operatively coupled to a computer that receives the time pulses provided by the optical sensors 125, 130, and 135 and detector 165. These time pulses can be processed in accordance with the above equations and processing represented by the exemplary MATLAB code.

FIG. 7 is a schematic block diagram of a detection system embodying the present invention with a single optical fiber transmitting all optical sensor signals to an array of detectors. The FIG. 7 system makes use of different light wavelengths provided by the optical sensors 170, 175, and 180. The light provided by the optical sensors 170, 175, and 180 is coupled to an N-to-1 optical connector 200 via short or local fiber optics 185, 190, and 195. As is known to those skilled in the art, the N-to-1 optical connector, 200, couples the light from each of the fiber optics, 170, 175, and 180 into the fiber optic 240. The optical fiber 240 carries the optical signals to the 1-to-N optical connector 205, which is typically located a safe distance from the event being monitored by the optical sensors, such as an explosion. As is well known to those skilled in the art, the 1-to-N optical connector, 205, couples the different wavelengths of light to the corresponding fiber optics 210, 215, and 220. The detectors 225, 230, and 235 detect the light carried by the corresponding fiber optics 210, 215, and 220. As with FIGS. 5 and 6, the detectors 225, 230, and 235 can comprise, for example, photodetectors that are sensitive to different wavelengths of light. The detectors 225, 230, and 235 can provide, for example, optoelectronic conversion of the optical signal detected on the corresponding fiber optics 210, 125, and 220. The detector can also provide filtering and threshold detection of the electric signal generated by the detector. While not shown in FIG. 7, the detectors 225, 230, and 235 are operatively coupled to a computer that receives the time pulses provided by the optical sensors 170, 175, and 180 and detectors 225, 230, and 235. These time pulses can be processed in accordance with the above equations and processing represented by the exemplary MATLAB code.

The invention claimed is:

1. A method of determining a path of a projectile comprising:

detecting a first time of arrival of the projectile in a first plane;

detecting a second time of arrival of the projectile in a second plane;

detecting a third time of arrival of the projectile in a third plane oriented to intersect the second plane along a first line;

detecting a fourth time of arrival of the projectile in a fourth plane;

detecting a fifth time of arrival of the projectile in a fifth plane oriented to intersect the fourth plane along a second line orthogonal to the first line;

detecting a sixth time of arrival of the projectile in a sixth plane; and determining the path and speed of the projectile based on the first through sixth times.

2. A method according to claim 1, further including:

detecting a seventh time of arrival of the projectile in a seventh plane;

and wherein the determining includes determining the path and speed of the projectile based on the first through seventh times.

3. A method according to claim 1, wherein the determining the path and speed of the projectile further includes basing the determination on the orientation of the planes.

4. A method according to claim 1, wherein the determining the path and speed of the projectile further includes basing the determination on the orientation of the planes.

* * * * *